May 11, 1943. E. H. PIRON 2,318,798
FLUID PRESSURE ACTUATED BRAKE SYSTEM
Filed April 2, 1940
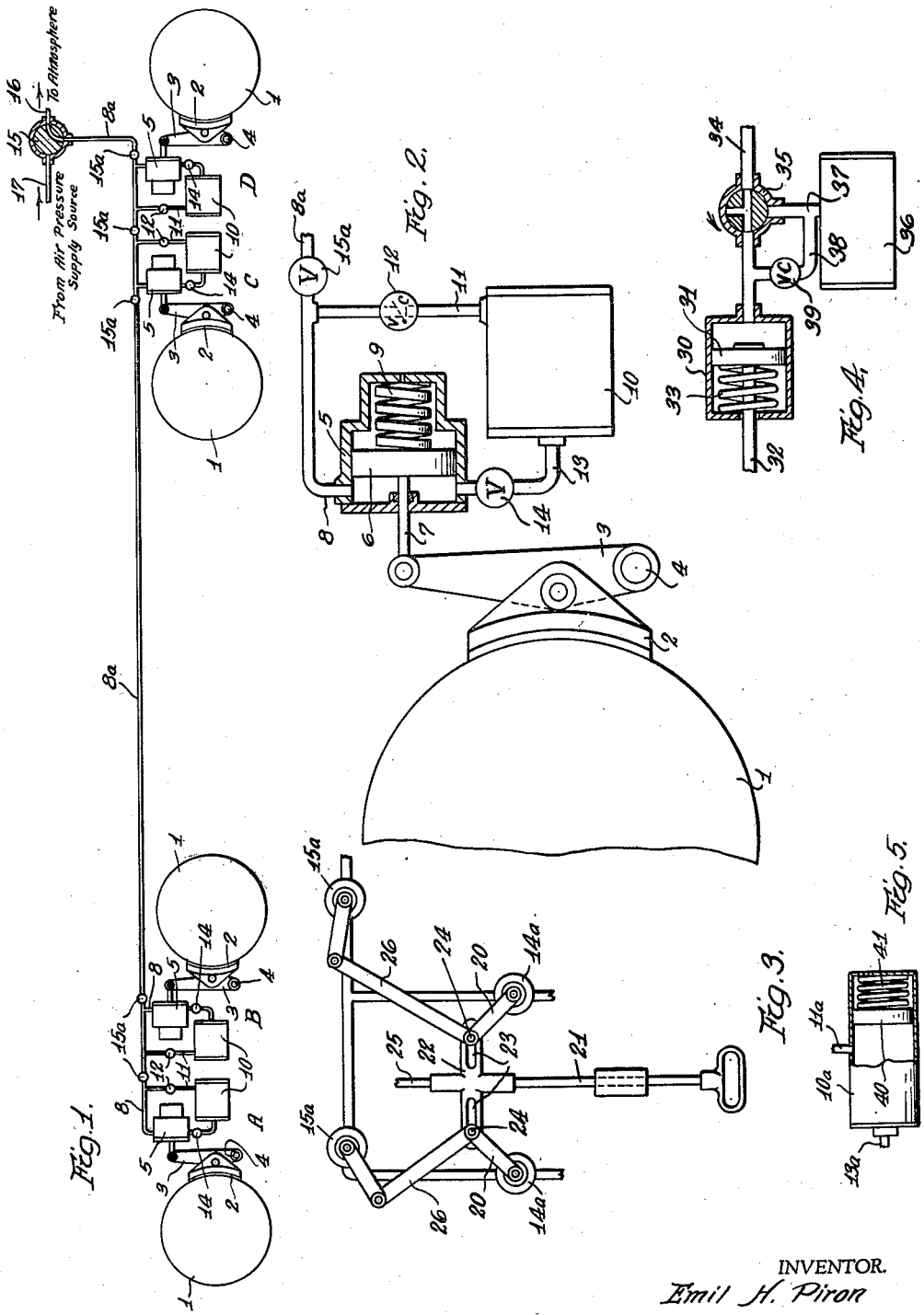
INVENTOR.
Emil H. Piron
BY
ATTORNEY.

Patented May 11, 1943

2,318,798

UNITED STATES PATENT OFFICE 2,318,798

FLUID PRESSURE ACTUATED BRAKE SYSTEM

Emil H. Piron, New York, N. Y., assignor to Transit Research Corporation, a corporation of New York Application April 2, 1940, Serial No. 327,478

1 Claim. (Cl. 303—63)

This invention relates to brakes for rail vehicles, such as street cars, and has for its primary object to provide a fluid brake system wherein the brakes are automatically applied, when the fluid pressure source fails, and auxiliary fluid pressure means in combination therewith for releasing the brakes to enable movement of the vehicle to a repair shop, as by towing the vehicle.

Rail vehicles, and particularly street cars, are equipped with a hand brake for use under emergency conditions, such as when the fluid pressure source fails and the fluid actuated brakes become ineffective for this reason. The hand brake, of course, is inadequate as far as operating the vehicle in traffic is concerned, and is not intended for use as a service brake. If the fluid actuated brakes should fail under emergency conditions the operator of the vehicle must change from the fluid actuated brake controls to the hand brake controls. The purpose of this invention is to make the change from fluid actuated brakes to manual brakes unnecessary by causing automatic application of the fluid actuated brakes when the fluid pressure falls below a predetermined point to thereby avoid the possibility of accident through inability to stop the vehicle.

Another object of the invention is to provide a braking system wherein yielding pressure means, such as springs, are employed to apply the brakes and fluid pressure means is employed to release the brakes. In such an arrangement, when the fluid pressure falls to a pressure value less than the pressure exerted by the spring the brakes are automatically applied. When the fluid pressure source fails completely, the brakes are fully applied and maintained in their "locked" position.

Another object is to provide manually controllable means for individually releasing the brakes after they have been applied under conditions such as above noted. To this end each brake is equipped with a storage chamber in which fluid under pressure is stored during normal operation of the air brakes, the chamber being connected to the fluid line by a non-return connection so that it retains the fluid therein when the pressure fails in the fluid line. Each storage tank is connected to the adjacent brake through a manual valve which when operated admits fluid from the storage tank to the brake actuator and releases the brakes. With the brakes so released the vehicle may be towed to a repair shop. As will hereinafter become apparent, the fluid may be either liquid or gaseous.

Other objects and advantages will become more fully apparent as reference is had to the accompanying drawing wherein my invention is illustrated, and in which:

Fig. 1 is a diagram of a vehicle braking system,

Fig. 2 is an enlarged diagram of a unit adjacent a wheel,

Fig. 3 is a diagrammatic view illustrating means for operating a multiplicity of auxiliary control valves simultaneously, Fig. 4 is a schematic view illustrating a modified valve arrangement, and Fig. 5 is a view illustrating an auxiliary tank for liquid fluids.

Referring to Fig. 2, 1 designates the wheel of a rail vehicle which is contacted by a brake shoe 2 carried by a lever 3. The lever 3 is swingably mounted upon a support 4 so that swinging movement in one direction causes the shoe 2 to contact the wheel and movement in the other direction carries the shoe out of contact with the wheel. This structure is intended to generally represent any conventional or special brake shoe assembly, where the brake shoe adjacent each wheel is individually operated, or where the two shoes adjacent a pair of wheels on an axle are connected through equalizer means for simultaneous actuation. Brake shoe supporting and actuating means are well known in the art and it is deemed unnecessary, therefore, to illustrate the same in detail here.

Adjacent the lever 3 is a cylinder 5 having a reciprocal piston 6 therein connected to the swinging end of the lever 3 by a rod 7. Air under pressure is supplied to the cylinder 5 through a pipe line 8 to move the piston in a direction to swing the lever 3 and move the shoe 2 from contact with the wheel, and a spring 9 normally urges movement of the piston in a direction to apply the shoe against the wheel. Obviously, when the air pressure is less than that exerted by the spring the shoe remains applied against the wheel.

Ajacent the cylinder 5 is an air reservoir 10 which is connected to the air line 8 by a conduit 11 having a non-return valve 12 therein. The reservoir 10 is connected to the cylinder 10 by a conduit 13 having a manual valve 14 therein. The manual valve 14 is normally closed, and when air under pressure is present in the air line 8, the reservoir 10 is filled with air. The closed valve 14 and the non-return valve 12 prevents the escape of air from the reservoir with the result that it remains charged with compressed air.

As may be seen in Fig. 1, a unit such as above described is provided at each axle of the vehicle, and the several units are designated A, B, C and D. The air lines 8 of the several units are connected to a common air line 8a, which extends to a two-way valve 15. With the valve 15 in the position shown, the air line 8a is in communication with an exhaust port 16 so that the pressure in the air line is reduced to atmospheric pressure. The springs 9 in the several units accordingly cause application of their respective brakes. When the valve 15 is rotated 90° clockwise, it establishes communication between an air pressure source line 17 and the air line 8a, and the air under pressure thus admitted to the air line 8a causes release of the several brakes.

In case the source of air pressure fails the valve 15 may be moved to a position where the air line 8a is out of communication with both the exhaust 16 and the air pressure intake 17, and the valves 14 are individually opened. Opening of the valves 14 admits air under pressure to their respective cylinders 5 and releases the brakes so that the vehicle may be moved to a repair shop.

In Fig. 3 there is illustrated means for actuating two or more of the valves 14 in unison, the purpose being to provide for actuation of all the valves 14 on one truck at one time. The valves 14a, corresponding to the above described valves 14, have actuating arms 20 connected thereto, for opening or closing the valves by swinging movement thereof. A manually slidable rod 21, suitably supported on the vehicle truck, has a cross beam 22 formed with slots 23 receiving pins 24 on the swinging ends of the arms 20. When the rod 21 is pulled downwardly (as the reader views Fig. 3) the cross beam 22 causes the valves 14a to open. In the case of a truck having four valves the rod extension 25 is connected to another cross beam such as the one 22 for operating the other valves which will have actuators similar to the valves 14a.

Very often the reason for failure of the air pressure is because of a leak in the lines 8 and 8a, and in order to prevent the emergency air pressure from leaking through these lines additional valves 15a are placed in the line 8 and when closed they prevent the emergency air from passing back through the line 8, and also from passing from one unit to the other. As shown in Fig. 3, the valves 15a, corresponding to the valves 15a of Fig. 1, are connected to the valve operating member 22 so that they are actuated thereby. The linkage 16 which operates the valves 15a is preferably constructed so that the valves 15a are closed slightly in advance of the opening of valves 14a.

In Fig. 4, there is illustrated a cylinder 30 having a plunger 31 therein with a connecting rod 32 adapted to be connected to a brake operating lever. The plunger 31 is adapted to be moved in one direction by a spring 33 to pull the rod 32 to apply the brakes, rather than to push as shown in Fig. 2. The brakes are released by air pressure supplied through a pipe line 34 having a two-way valve 35 therein. An air reservoir 36 is connected by a pipe line 37 to the valve 35 and by a pipe line 38 and check valve 39 to the line 34. When the valve 35 is in the position shown the brakes operated by the unit may be controlled by the main valve similar to the valve 15 of Fig. 1, and the air pressure so utilized to operate the unit charges the reservoir 36. When the valve is rotated counterclockwise through 90°, it disconnects the line 34 from the unit and connects the pipe 37 therewith so that the air with which the reservoir was previously charged moves the plunger 31 to release the brakes.

As shown in Fig. 5, the reservoir 10a, which corresponds to the reservoir 10 above described, has a piston 40 therein against which a spring 41 presses. This structure is used when a liquid or incompressible fluid is present in the system. As in the case of air, when the pressure source fails, the spring 41 moves the piston 40 to expel liquid from the reservoir 10a under sufficient pressure to retract the brakes.

It will be obvious to those skilled in the art that the system above described is not limited to brake shoes which act directly on the wheels, but might be used for actuating brake means of the band type, as well as those which operate on a drum on the axle of the propeller shaft of the truck.

Although a specific embodiment of the invention has been illustrated and described, it will be understood that various changes may be made within the scope of the appended claim without departing from the spirit of the invention, and such changes are contemplated.

What is claimed is:

A braking system for a rail vehicle having wheels comprising brake shoes adapted to contact wheels of the vehicle, yielding constant pressure means urging said shoes into contact with respective wheels, fluid pressure means for moving said shoes out of contact with the wheels, manually controllable means for conveying fluid under pressure to said fluid pressure actuated means, fluid reservoirs, means including a non-return valve connecting the reservoirs to said fluid conveying means, means including a manually operable valve connecting said reservoirs to said fluid pressure actuated means, and means connecting said manually operable valves for group actuation.

EMIL H. PIRON.